Nov. 10, 1925.

F. OLDFIELD

NAIL

Filed Nov. 12, 1924

1,561,104

Inventor
Fred Oldfield
by Roberts, Roberts & Cushman
Attys.

Patented Nov. 10, 1925.

1,561,104

UNITED STATES PATENT OFFICE.

FRED OLDFIELD, OF PORTSMOUTH, NEW HAMPSHIRE, ASSIGNOR TO MORLEY BUTTON MANUFACTURING COMPANY, OF PORTSMOUTH, NEW HAMPSHIRE, A CORPORATION OF MAINE.

NAIL.

Application filed November 12, 1924. Serial No. 749,418.

*To all whom it may concern:*

Be it known that I, FRED OLDFIELD, a citizen of the United States of America, and resident of Portsmouth, in the county of Rockingham and State of New Hampshire, have invented new and useful Improvements in Nails, of which the following is a specification.

This invention relates to nails of the type having a shank adapted to be driven into a surface and an enlarged head for securely holding any desired object or material, and wherein the head is not integral with the shank but built or formed thereon.

Nails of this general type are widely used whenever a relatively broad flat head providing security of holding and freedom from cutting and scarring of the material to be held are essential. As a specific example of a use to which such nails generally, and the present nail especially, may advantageously be put, the holding to moldings of twisted electric wires may be mentioned.

The general objects of the invention are to provide an improved nail of the type mentioned, in which the head will be securely held to the shank, in which loosening of the head on the shank may be avoided, in which a change in the angular relation of the head to the shank will not readily occur, in which a substantially plane widely extended holding surface will be provided by the head, and in which the head will not pull off when extracting the nail.

According to a preferred method of construction of the present invention the shanks may be formed with relatively small integral heads. These shanks may be passed through disks of fibrous material, preferably by driving or forcing the shank therethrough until the head comes to rest upon the surface of the disk. These disks and the head ends of the shanks may then be mounted in cup shaped sheet metal head members which are circular in cross-section, have a closed bottom which subsequently becomes the top surface of the nail head, and have a cylindrical wall terminating in a serrated edge. The loosely assembled parts may then be suitably treated between dies, thereby providing a composite finished nail having a head which consists of a metallic covering and a fibrous filler so related to the shank as to hold the latter in the desired rigid relation.

In the finished form of the nail head there is provided a metallic shell enclosing the top and sides and the major portion of the bottom of the disk, the metal of the casing underlying a relatively wide annular portion of the bottom of the disk and the serrations projecting even further towards the shank of the nail and entering the material of the disk. As a result of this construction a number of beneficial results are obtained. Since the bottom of the disk is supported by a relatively wide band of metal, loosening of the disk due to pulling out at its edge from beneath the edge of the metal casing is wholly precluded. Moreover, looseness of the shank due to the possibility of springing the disk is avoided, for the casing covers so large a portion of the lower surface of the head that springing is prevented. The inturned points of serrations also contribute substantially to the rigidity since they interlock with the disk and so not only stiffen the latter, but also both strengthen the inturned rim and provide a resistance to lateral deflection of the nail shank by necessitating a much greater unit stress in the material between them and the shank for deflection to occur than would be the case were the disk held only at its edges. A still further advantage of the radially directed serrations terminating in points embedded in the disk lies in the fact that a much wider turning in of the metal of the casing beneath the edge of the disk is possible than could be secured by any other process. Such a nail may obviously be driven with less danger of destruction due to a misdirected blow and may be pulled without fear either that the disk will be wholly pulled from the metallic casing or that the shank will be torn through the disk.

For purposes of illustration, one illustrative form of the invention and certain steps in the manufacture thereof are shown in the accompanying drawings in which.

Figure 3:
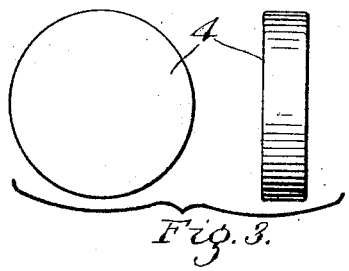
Figure 4:
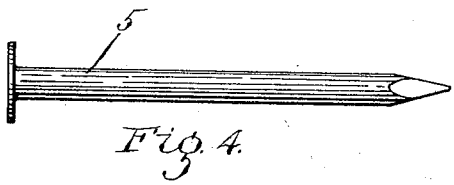
Figure 5:
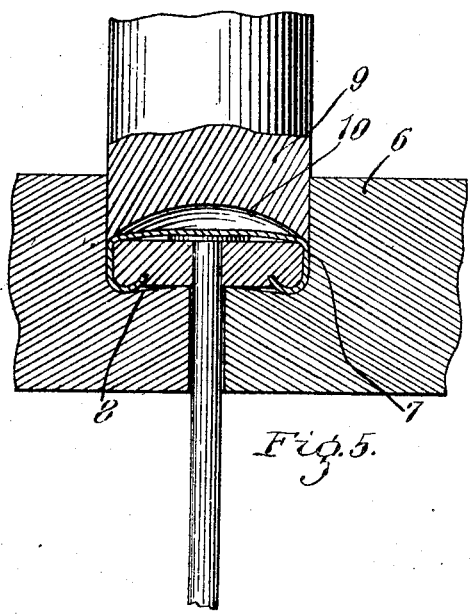
Figure 6:
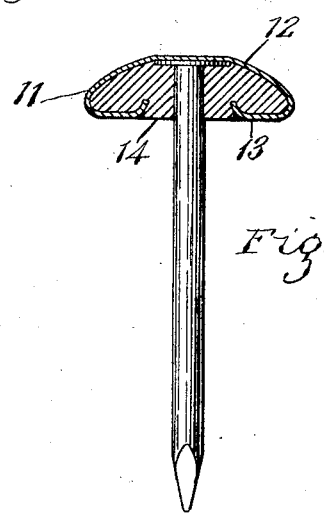

Fig. 3 discloses in plan and in side elevation a disk forming a portion of the finished nail;

Fig. 4 shows a commercial form of flat headed nail which forms the shank of the finished nail;

Fig. 5 is a view on a section passing substantially through the axis of the nail and through a mechanism employed in the production of the nail, showing the nail in course of receiving the final operation thereon; and Fig. 6 is a central axial section through a finished nail, the shank of the nail being shown in elevation.

Figure 1:
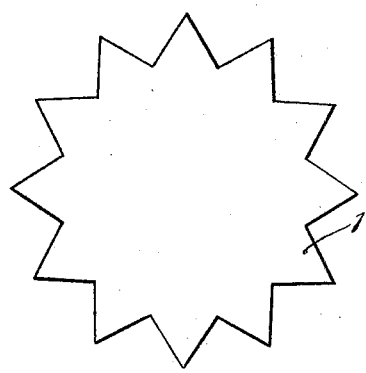
Fig. 1 is a plan view of a stamping from which the casing of the nail head is produced.
Figure 2:
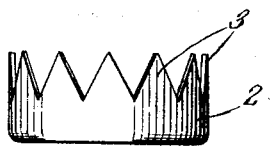
Fig. 2 is a side elevation of one of these stampings after an operation has been performed thereon.

In the production of the nail shown for the purpose of illustration in the appended drawings a blank 1 (see Fig. 1) having a serrated edge, is stamped from suitable thin sheet metal. This blank is subjected to the action of appropriate dies with the result that a cup-shaped member 2 of a diameter substantially equal to the desired diameter of the finished nail head and having a cylindrical peripheral wall having a series of projecting points 3 is produced, as shown in Fig. 2. This cup-shaped member, which is designated 2, is adapted to receive a disk member 4 (see Fig. 3) through which an ordinarily flat headed nail 5 of appropriate length and diameter is adapted to be driven for the purpose of enabling the securing of such nail within the cup member 2. It is obvious that the disk 4 may be perforated prior to the insertion of the nail 5 therein, but by forcing or driving the nail through the disk the initial adherence of the disk to the nail provides additional rigidity. The disk 4 may be of any suitable material such as heavy cardboard, fibre or button board and is cut therefrom so that the fibres extend primarily in planes parallel to the flat surfaces of the disk. Its primary requisites are sufficient rigidity to enable it to securely hold the nail 5 against lateral deflection and toughness to prevent the nail 5 tearing out. After the nail 5 has had the disk 4 placed thereon, the disk and the head of the nail are inserted within the cup 2, and thereafter the parts are placed with the points 3 upon the cup 2, and thereafter the parts are placed with the points 3 upon the cup 2 facing toward the bottom of a die recess within a die mechanism 6, which provides a recess 7 having a bottom 8 so formed as to rebend the points 3 upon themselves and cause them to penetrate the lower surface of the disk. A suitable follower 9 having a concave extremity 10 adapted to engage the bottom of the cup member 2 forces the member 2 with its contained parts downwardly into the recess 7 with the result that the points 3 of the member 2 are directed first radially and then subsequently reversely toward the head of the nail 5 as shown in Figs. 5 and 6. When the operation is completed the points will comprise portions substantially contacting with each other at their edges and lying in a plane to which the shank is perpendicular, and portions penetrating the lower side of the disk, and the only part of the disk exposed will be an annulus not substantially larger than the head integral with the nail 5.

As a result of this construction there is provided a head 11 of very substantially larger diameter than the head of the nail 5 and which has at its outer end a convex surface 12, while its opposite surface 13, that toward the point of the nail, is substantially plane and is formed by the radially directed portions of the points 3 upon the member 2 and by the exposed portion 14 of the disk 3. It should be noted that the bottom 8 of the recess 7 may be either plane or slightly higher in its center than at its edges, the latter construction operating, in view of the relatively elastic material of the disks, perhaps more effectively to provide a plane bottom side for the nail head.

When employing a relatively soft material such as cardboard, fibre board or button board for the disks 4 these are preferably but not necessarily treated to an indurating process, which may be of any suitable nature, after the nail is otherwise complete. Subsequent to the indurating operation the nails may be painted if desired.

It will be observed that as a result of the direction imparted to the points 3 not only is the disk 4 most securely held, but also the inwardly directed points serve to reduce the diameter of the portion of the disk which must be bent in order for the shank 5 to be twisted relative to the head 11. In other words the finished product is stronger in all particulars than would be a similar article produced simply by gripping the peripheral edge of the disk 4, for deflection of the nail shank 5 relative to the head will be resisted more strongly because the material between the points and the shank must be subjected to a greater unit stress before it will yield. Moreover, the deflection of the disk which is necessary to permit the shank to move relative to the head must occur in a portion of much smaller diameter than that of the disk 4. As a result this nail is very rigid and the head cannot readily loosen upon or pull off from the shank. Moreover the smooth surface formed by the parts 13 and 14 enables the nail to hold any object or material in place between parallel surfaces and all tendency toward cutting or bruising is completely eliminated.

It will be seen that I have provided a construction which satisfies the objects enumerated above and one which constitutes a valuable advance in the art. While I have shown the invention in a certain physical embodiment it is to be understood that modifications of the structure shown may be made by those skilled in this art without departing from my invention as expressed in the following claims:

I claim:

1. A nail comprising, in combination, a shank, a disk in which said shank is mounted, and a metallic casing enclosing said disk and having portions penetrating the latter for a substantial distance in an annulus spaced materially from the periphery of the disk.

2. A nail comprising, in combination, a shank having a pointed end and a flat head, a disk of fibrous material surrounding said shank adjacent said head, and a metallic casing adapted to form the head of the nail and enclosing said disk and flat head and having a plurality of points whose extremities are embedded in said fibrous disk.

3. A nail comprising, in combination, a shank having a pointed end and a flat head, a disk of fibrous material surrounding said shank adjacent said head, and a metallic casing adapted to form the head of the nail and enclosing said disk and flat head and having a plurality of pointed portions each of which comprises a part lying substantially in a plane to which the shank is perpendicular, and a part making an angle with said last mentioned part and embedded in the disk.

4. A nail comprising, in combination, a shank having a pointed end and a flat head, a disk of fibrous material surrounding said shank adjacent said head, and a metallic casing adapted to form the head of the nail and enclosing said disk and flat head and having a plurality of sharp points each of which comprises a portion lying substantially in a plane to which the shank is perpendicular, and a portion making an angle with said last mentioned portion and embedded in the disk, the first mentioned portions of said points substantially contacting with each other at their edges.

5. A nail comprising, in combination, a head comprising a metallic cover and a filler of fibrous material and a shank mounted at one end in said filler, said cover completely overlying all of the surfaces of said filler except one, and having points formed thereon projecting into said filler for a substantial distance adjacent the edge of the uncovered portion of the latter.

Signed by me at Portsmouth, N. H., this seventh day of November, 1924.

FRED OLDFIELD.